United States Patent [19]

Gottier

[11] Patent Number: 4,747,858

[45] Date of Patent: May 31, 1988

[54] PROCESS FOR REMOVAL OF CARBON DIOXIDE FROM MIXTURES CONTAINING CARBON DIOXIDE AND METHANE

[75] Inventor: Gerry N. Gottier, Emmaus, Pa.

[73] Assignee: Air Products and Chemicals, Inc., Allentown, Pa.

[21] Appl. No.: 98,262

[22] Filed: Sep. 18, 1987

[51] Int. Cl.$^4$ ............................................... F25J 3/00
[52] U.S. Cl. .......................................... 62/17; 55/68; 62/20; 62/28
[58] Field of Search ................. 62/17, 20, 27.8; 55/68

[56] References Cited

U.S. PATENT DOCUMENTS

| | | | |
|---|---|---|---|
| 3,656,312 | 4/1972 | Streich | 62/28 |
| 4,149,864 | 4/1979 | Eakman et al. | 62/28 |
| 4,230,469 | 10/1980 | Grimm et al. | 62/28 |

Primary Examiner—Ronald C. Capossela
Attorney, Agent, or Firm—Geoffrey L. Chase; William F. Marsh; James C. Simmons

[57] ABSTRACT

An absorptive distillation using a $C_7$ to $C_8$ physical solvent without overhead condenser-reflux duty is described for separation of carbon dioxide from methane, wherein the separation preferentially uses heat energy in contrast to mechanical energy or power.

17 Claims, 1 Drawing Sheet

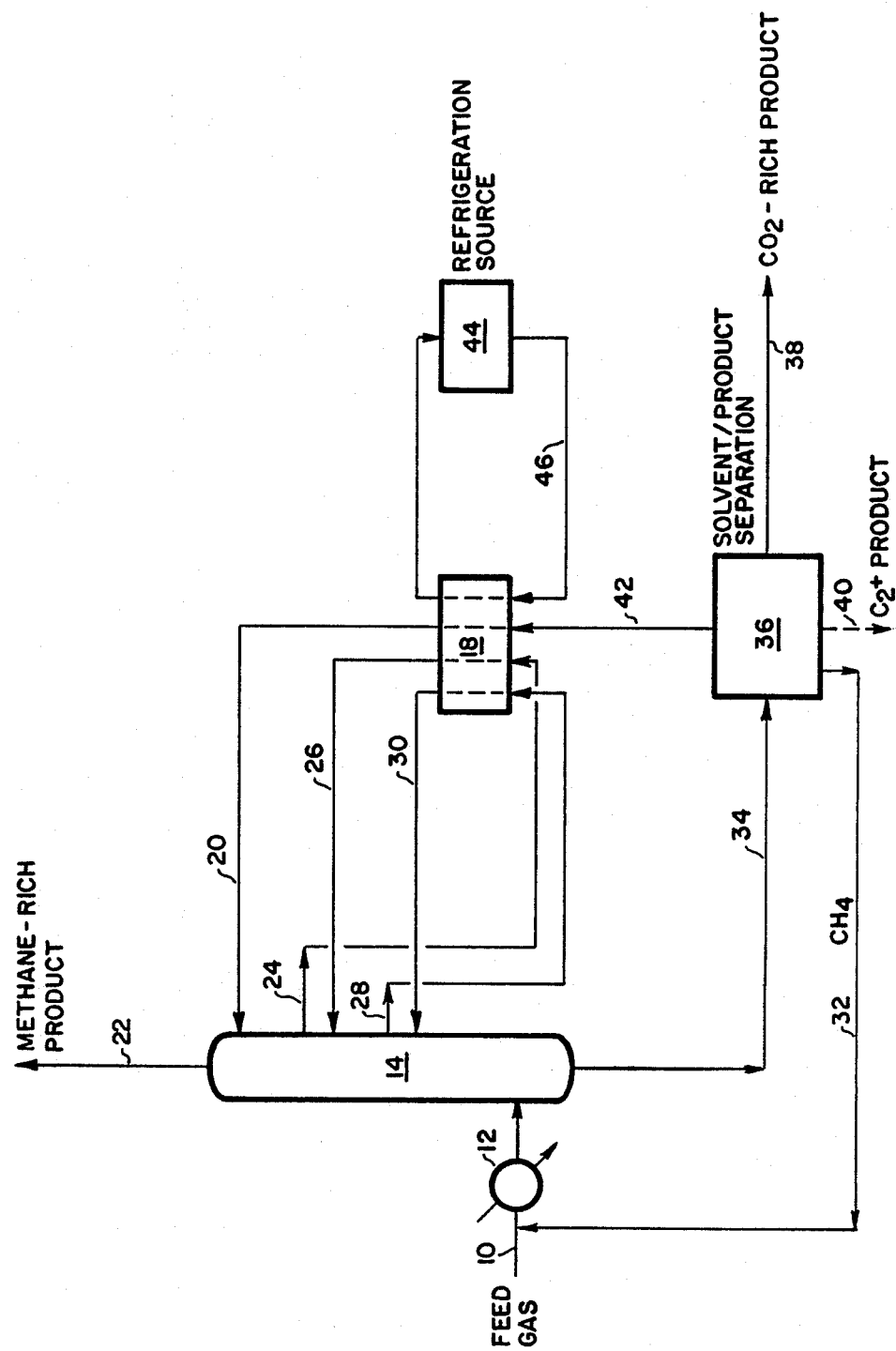

PROCESS FOR REMOVAL OF CARBON DIOXIDE FROM MIXTURES CONTAINING CARBON DIOXIDE AND METHANE

TECHNICAL FIELD

The present invention is directed to the field of physical absorptive solvent distillation of carbon dioxide and lower hydrocarbon-containing gas streams.

More specifically, the present invention is directed to the above separations where power requirements are shifted from mechanical energy to heat energy to effect the separation.

BACKGROUND OF THE PRIOR ART

The use of carbon dioxide miscible flooding of petroleum reservoirs for enhanced petroleum recovery results in a gas stream of high carbon dioxide composition being produced at the wellhead with the balance of the stream typically consisting of $C_1$–$C_7$ paraffins, nitrogen and small amounts of hydrogen sulfide. It is often necessary to recover a methane-rich product stream from this feed due to either economic attractiveness or purity requirements for the carbon dioxide-rich product stream which is to be reinjected into the petroleum reservoir for production enhancement. The methane product specification may call for fuel gas quality or pipeline quality, including hydrogen sulfide removal to ¼ grain per 100 standard cubic feet. While the carbon dioxide product purity specification varies widely between applications, this carbon dioxide product will generally be required at elevated pressures (1,200 psia or above) for reinjection into the petroleum reservoir.

Although several methods presently exist to effect similar separations, all of these methods require a substantial input of mechanical energy for carbon dioxide recompression or for refrigeration of the separatory process. At a typical carbon dioxide flood geographic location, however, electrical power is relatively expensive compared to availability of fuel gas, which may be produced in a carbon dioxide/hydrocarbon separation facility or in a neighboring facility associated with the enhanced oil recovery operation. Although mechanical energy may be generated by combustion of fuel gas in gas engines or combustion gas turbines, the additional machinery requires additional capital investment, which offsets the advantages of using the lower cost energy source.

In some cases, gas engines or combustion gas turbines may already be used for compression of the carbon dioxide portion of the wellhead gas back to reinjection pressures. A substantial amount of waste heat is available from the exhaust gas of that recompression equipment. This waste heat is presently utilized by converting the heat into mechanical power by raising steam to drive steam turbines. The resulting energy is then utilized to run mechanical energy intensive refrigeration-based separatory processes as set forth below.

There are several technologies available for separating carbon dioxide and methane. The best known examples of these are the following: Refrigerated distillation uses a methane-rich liquid reflux from an overhead condenser to wash carbon dioxide from a feed stream. This process is severely limited by the potential for carbon dioxide to freeze-up at the triple point temperature of approximately $-69°$ F. Allowing for a safe approach to freeze-up, the maximum purity of the methane-rich product is about 15–35% carbon dioxide, depending upon the pressure of the distillation and the presence of other like components. such as nitrogen. Increasing the pressure to raise the temperature will not circumvent the freeze-up problem, since pressure is limited to about 700 psia by the mixture critical point. Therefore, it is generally necessary to combine refrigerated distillation with additional processing steps to meet fuel gas or sales gas specifications. Although refrigerated distillation will yield a high-purity carbon dioxide product with little loss of feed pressure, high capital and operating costs are incurred by the need for refrigeration at $-60°$ F. to $-65°$ F.

Membrane processes exploit the ability of certain materials to preferentially permeate carbon dioxide from carbon dioxide/hydrocarbon mixtures. For the carbon dioxide/methane separation, however, the difference in the permeabilities of the two components is insufficient to allow for high purity and recovery of each component unless complex and costly staging and recycling techniques are used. Therefore, the use of membranes in carbon dioxide/methane separation is generally limited to bulk carbon dioxide removal followed by a polishing step. In addition to this limtation, the carbon dioxide is produced at low pressure and requires capital and energy intensive recompression. The membrane area required to permeate the carbon dioxide, which is the major component in the stream, can also be quite costly.

Chemical solvents, such as MEA, DEA, activated MDEA, and others, absorb carbon dioxide from the feed stream at feed pressure, then are flashed to low pressure and heated to strip the carbon dioxide and regenerate the lean solvent. Under certain product requirements, it is possible to regenerate activated MDEA without heating. These processes may be used as stand-alone processes or as polishing steps following bulk carbon dioxide removal by processes such as refrigerated distillation or membranes. The processes are capable of very high purities and recoveries of both methane and carbon dioxide, but high operating and capital costs are incurred in recompressing the product carbon dioxide when chemical solvents are used as stand-alone processes. When these solvents are used as polishing steps, the shortcomings of the overall process will be dictated by the shortcomings of the bulk removal step.

Physical solvents, such as selexol, absorb carbon dioxide from the feed stream at relatively high pressure and are then flashed to low pressure to liberate the carbon dioxide and regenerate the lean solvent. Depending upon the absorber pressure and the product purity requirement, refrigeration may be required for solvent cooling, and heat input may be required for solvent regeneration. As for the chemical solvents, physical solvents may be used in stand-alone processes or as polishing steps. Although these processes are capable of high purities and recoveries of both methane and carbon dioxide, high operating and capital costs are incurred in recompressing the product carbon dioxide when physical solvents are used as stand-alone processes. When these solvents are used as polishing steps, the shortcomings of the overall process will be dictated by the shortcomings of the bulk removal step.

Extractive distillation is typically referred to as the Ryan/Holmes process. The extractive distillation involves addition of a recycled liquid agent to the condenser of a distillation column, as described in U.S. Pat.

Nos. 4,428,759 and 4,451,274. Addition of the agent increases the temperature of the distillation such that at no point in the column does the temperature drop as low as the triple point temperature of carbon dioxide. The bottoms product of the distillation contains carbon dioxide and the liquid agent and must be further processed to yield the carbon dioxide product and the liquid agent to be recycled. The above patents demonstrate that the proper combination of agent addition and column operation allows the distillation to be performed with a lowest temperature of about −35° F., thus allowing the use of propane refrigeration. The process is capable of high purity and recoveries for both methane and carbon dioxide, and depending upon the pressure at which the distillation is performed, the carbon dioxide product may be produced at or near feed pressure. Therefore, this process is generally the preferred choice for this type of separation. However, the need for refrigeration at about −35° F. to operate the overhead condenser and to provide partial liquefaction of the feed still leads to substantial capital cost and power usage. An additional Ryan/Holmes-type separation is disclosed in U.S. Pat. No. 4,318,723. All three of these cited patents utilize refrigeration at relatively low temperatures for overhead condensing duty, for extractant cooling, and in some instances, for feed precooling.

Additional patents of interest to resolution of lower hydrocarbon, hydrogen sulfide and carbon dioxide containing feed gas streams using extractive distillation include U.S. Pat. Nos. 4,293,322, 4,350,511, 4,370,156, 4,383,842 and 4,556,404.

None of the above technologies provide an efficient process to separate carbon dioxide and hydrogen sulfide from methane while producing a carbon dioxide product at or near feed pressure. Furthermore, it is readily apparent from the literature that the need for such a process to economically integrate with the existing energy sources available has not been addressed. Thus, the potential for economic savings by using alternative technology particularly of the present invention has not been realized prior to this time.

BRIEF SUMMARY OF THE INVENTION

The present invention is a process for the physical solvent absorptive distillation of a feed gas stream containing carbon dioxide, methane and heavier hydrocarbons to produce a methane-rich overhead product and a carbon dioxide-rich bottom product comprising the steps of introducing a feed gas stream comprising carbon dioxide, methane and heavier hydrocarbons into an absorptive distillation zone at elevated pressure, introducing a physical solvent in the amount of approximately 0.5 to 5.0 moles of solvent per mole of feed into the upper zone of the distillation zone to absorb carbon dioxide and heavier hydrocarbons from such feed gas stream, withdrawing a methane-rich overhead stream from said distillation zone as a product without subjecting it to any overhead condenser-reflux duty, removing heat from said distillation zone in at least one intermediate stage of the distillation zone between the point of entry of the physical solvent and the feed location and removing and heating the carbon dioxide and heavier hydrocarbon-containing physical solvent at approximately the elevated pressure of the feed gas stream to separately recover a regenerated physical solvent recycled to the upper zone of said distillation zone, a carbon dioxide-rich bottom product, and a methane-rich stream which may be recycled to the feed stream.

Preferably, the feed gas stream is at a pressure in the range of approximately 200–1,000 psia.

Alternatively, the feed gas stream is initially cooled to a temperature in the range of approximately 0° F. to 50° F.

Preferably, heat is removed from the distillation zone in two intermediate stages. Optimally, the intermediate stages are located at a point intermediate the point of introduction of the physical solvent into the absorptive distillation zone and a point of introduction of the feed gas stream into the absorptive distillation zone. Preferably, the heat removal in the intermediate stages of the absorptive distillation zone is accomplished by removal of distillation zone fluid from the zone, cooling of said removed fluid by heat exchange with a source of refrigeration and return of the cooled fluid to said distillation zone.

Preferably, the separate recovery of physical solvent from a carbon dioxide-rich bottom product is accomplished by distillation at relatively high pressure. Optimally, this pressure is in the range of approximately 300–400 psia.

The physical solvent used in the absorptive distillation separation is precooled to a temperature of approximately 0° F. to 50° F. before being introduced into the absorptive distillation zone.

Alternatively, hydrocarbons in the range of $C_2$ to $C_5$ are separately recovered from the carbon dioxide and heavier hydrocarbon absorbed physical solvent.

The physical solvent is selected from the group consisting of $C_7$ to $C_8$ hydrocarbons and mixtures thereof.

Preferably, the feed gas stream is introduced into the absorptive distillation zone in essentially the gaseous phase.

BRIEF DESCRIPTION OF THE DRAWING

The drawing is a schematic representation of a preferred embodiment of the process of the present invention.

DETAILED DESCRIPTION OF THE INVENTION

The present invention for physical solvent absorptive distillation of a feed gas stream containing carbon dioxide, methane and heavier hydrocarbons, as well as minor amounts of hydrogen sulfide, is useful in processing of gas streams associated with carbon dioxide miscible flooding of petroleum reservoirs for enhanced petroleum recovery operations. When carbon dioxide miscible flooding is performed on a petroleum reservoir, carbon dioxide is pressurized down into the producing geologic formation containing the petroleum to act as a pressurizing medium and as a solvent to enhance the production of petroleum and associated gases to a production well wherein the petroleum and associated gases are recovered as products. The associated gas is valuable for two reasons. First, the associated gas has fuel value in the methane content and heavier hydrocarbons associated with the methane. Secondly, the associated gas has a significant concentration of carbon dioxide which breaks through from the injection well. It is advantageous to efficient enhanced petroleum recovery to separate this produced carbon dioxide and recycle it for additional carbon dioxide miscible flood operation.

The use of carbon dioxide miscible flood operations and the need for the resulting carbon dioxide separation usually occurs in geographical regions remote from readily accessible and economic power sources for mechanical power. For instance, electric availability to run refrigeration equipment is either unavailable or prohibitively expensive in remote regions where enhanced petroleum recovery is practiced. It is therefore beneficial to derive most of the energy necessary for the operation of a carbon dioxide separation from associated produced gases from the fuel value recovered in the associated gases used in a conversion of the energy to heat. Using the energy of the produced associated gases in the form of heat, rather than mechanical energy, provides an accessible economic source of energy and avoids the larger capital outlay that would be necessary to convert the energy value of the produced associated gases into mechanical energy such as electric power for refrigeration production.

Accordingly, the present invention provides a significantly heatbased separation of carbon dioxide from associated gases which differs from the refrigeration and mechanical energy-based processes described in the prior art. In addition, because the carbon dioxide is being separately recovered for reinjection, it is desirable to recover it at the highest possible pressure so that recompression requirements for its recycle do not become energy intensive.

A particularly important embodiment of the present invention results when the solvent flowrate is sufficient to maintain temperatures of 50° F. or above at all points in the process. The required cooling can then be supplied by using waste heat to drive water-lithium bromide absorption refrigeration systems, which are low cost units containing no compression equipment. In such an embodiment, no compression machinery is needed, and the only electrical power requirements are for the pumps used to circulate the lean solvent and the water-lithium bromide solution.

The present invention will now be described in greater detail with respect to a preferred embodiment corresponding to the drawing A feed gas stream in line 10 is introduced into the process at a pressure of 500 psia and a temperature of 50° F. containing 60% carbon dioxide, 35% methane, 5% nitrogen and residual amounts of hydrogen sulfide. Feed gas pressures can range in the approximately 200–1000 psia range. The feed gas stream is cooled by indirect heat exchange in heat exchanger 12 against an external refrigeration source, such as ambient temperature cooling water or a refrigeration producer, such as a closed circuit halocarbon mechanical refrigeration package. The feed gas stream is cooled to a temperature in the range of 0° F. to 50° F., and in this embodiment because the feed is already at 5° F., no further cooling is needed or is performed. The feed gas stream enters the process in the gaseous phase as a vapor stream. This feed gas stream is introduced into the bottom of the absorptive distillation zone 14. A physical solvent comprising 95% heptane and 5% octane which has been precooled to a temperature of 20° F. is introduced into the upper zone of the absorptive distillation zone 14 wherein the upper zone is an area above any intermediate stage of cooling of the distillation zone and below a point at which methane-rich product is removed from the distillation zone. The physical solvent can be precooled to a temperature in the range of approximately 0° F. to 50° F. The physical solvent is in the liquid phase and absorbs carbon dioxide, hydrogen sulfide and heavier hydrocarbon components from the feed gas stream in the distillation zone, yielding a methane-rich product stream in line 22 with a hydrogen sulfide content of less than ¼ grain per hundred standard cubic feet. The methane-rich product stream is separately recovered without the need for any condenser or reflux duty derived from a refrigeration source. Typically in distillative processes, liquid reflux is added at the top of the distillation zone to rectify mixtures in the feed. This is done usually by taking the overhead stream, cooling it against a relatively low temperature refrigeration source to partially condense it and returning only the condensed liquid to the distillation zone as reflux. The present invention does not need or use such condenser or reflux duty to effect the desired separation and specifically the recovery of substantially pure methane.

The upper section of the physical solvent absorptive distillation zone 14 is maintained at a relatively constant temperature by removing the heat of absorption created by the physical solvent absorbing the carbon dioxide, hydrogen sulfide and heavier hydrocarbon components, at two intermediate locations in the distillation zone, as well as adjusting the flow rate of the physical solvent. Distillation zone liquid is removed through line 24, cooled by heat exchange with a refrigeration source in heat exchanger 18, wherein the liquid is cooled to about 0° F. to 50° F., preferably 20° F. to 50° F. In the instant case, the liquid in line 24 at 30° F. is cooled to 20° F. for return in line 26 to the distillation zone 14. A second stage of intermediate cooling of the distillation zone is performed by removal of additional liquid in line 28 at a temperature of 33° F., cooling by heat exchange against a refrigeration source and heat exchanger 18 to a temperature of approximately 0° F. to 50° F. and in this instance cooling to 20° F. before being returned in line 30 to the distillation zone 14.

The refrigeration recycle lines 24–26 and 28–30 remove the heat of absorption of carbon dioxide, etc. at a stage of the distillation column where relatively warmer temperature levels are feasible, particularly in comparison to removing a similar quantity of heat at an overhead condenser area, where one pays a power penalty for the refrigeration required to remove heat at the relatively colder temperatures of the overhead condenser area. Accordingly, heat removal at a lower stage or tray of a distillation column is a more efficient refrigeration use.

The methane-depleted, carbon dioxide. hydrogen sulfide and heavier hydrocarbon containing physical solvent which also contains small amounts of coabsorbed methane is removed from the absorption zone in line 34 at approximately feed pressure of 500 psia and a temperature of 40° F. The resulting rich physical solvent stream is introduced into a solvent/product separation zone 36 wherein the carbon dioxide and hydrogen sulfide is separated from the physical solvent and heavier hydrocarbons in a heated distillation zone to recover a regenerated essentially physical solvent in line 42 at 500 psia and 100° F. comprising essentially 95 mol % heptane and 5 mol % octane, while recovering an essentially carbon dioxide-rich and hydrogen sulfide, containing bottom product in line 38, at a relatively high pressure of approximately 300 psia to 400 psia. A methane-rich recycle stream is withdrawn through line 32 and returned to the feed to minimize methane losses. Ethane and heavier hydrocarbons, up to but excluding hexane and heavier hydrocarbons, are separately removed in line 40 as a by-product of the process.

The regenerated physical solvent in line 42 at 500 psia and 100° F. is cooled to a temperature of approximately 0° F. to 50° F. by heat exchange against a refrigeration source in heat exchanger 18. In this instance. the regenerated physical solvent is cooled to 20° F. This solvent comprises 95 mol % heptane and 5 mol % octane. Other $C_7$ alkanes and higher alkanes can be used as the physical solvent. The predominant refrigeration source 44 constitutes a closed cycle refrigerant system cycling refrigerant, such as propane in line 46 to provide the cooling in heat exchanger 18 which is preferably a plate-fin heat exchanger allowing all refrigeration of intermediate stage liquids from the distillation zone as well as regenerated physical solvent to be cooled and refrigerated in the same heat exchanger. Appropriate refrigeration sources include ammonia systems, lower alkane systems and halocarbons, including halofluorocarbons used in a closed cycle compression and expansion process, as is well known in the prior art. Alternatively, at the higher end of the 0° F. to 50° F. range, ambient cooling sources, such as ambient water, can be used as the refrigeration source.

The present invention constitutes a considerable improvement in the separation of carbon dioxide from associated hydrocarbon gases in enhanced petroleum recovery, particularly for remote geographic locations in contrast to the prior art of extractive distillation and solvent separations by solving the problem of using a physical solvent which will absorb carbon dioxide and hydrogen sulfide from a carbon dioxide, hydrogen sulfide, methane and heavier hydrocarbon feed gas stream without requiring high refrigeration duties. The separation is controlled primarily through the physical solvent flow rate, rather than the refrigeration duty. In addition, little or no flashing of process streams to lower pressures is required for solvent regeneration. Rather, solvent regeneration can be achieved by stripping at or near the feed pressure. Both of these process characteristics of the present invention reduce the amount of power required to perform this separation by minimizing refrigeration power and carbon dioxide recompression power at the expense of using greater heat input in the present invention relative to the prior art, such as Ryan/Holmes processes. Substitution of a less expensive energy source (heat) for a more expensive energy source (mechanical energy) leads to a substantial decrease in operating cost.

In addition to reducing operating costs, the process also reduces capital outlay for machinery and apparatus. Minimizing the use of refrigeration and product recompression compared to the competing processes of prior art also minimizes the need for expensive compression machinery, both for refrigeration production and product preparation wherein distillation and heat exchange equipment provide the necessary energy input to effect the desired separations. Furthermore, in order for competing processes to use fuel as a power source, gas engines or turbines would be required to convert the fuel into power. Thus. the ability of the present invention to use the fuel directly as heat input energy to the separatory process of the present invention results in additional savings in necessary attendant machinery to the separatory process. Finally, the process of the present invention, in contrast to the prior art, allows the flexibility to adjust the ratio of power to heat input. Such flexibility is crucial to the integration of the process with associated systems, such as cogeneration or fuel-powered injection compressors wherein the waste heat from such compressors can be utilized in the present invention to its advantage.

The present invention has been set forth with regard to a preferred embodiment. However, the scope of the present invention should be ascertained from the claims which follow.

What is claimed:

1. A process for the physical solvent absorptive distillation of a feed gas stream containing carbon dioxide, methane and heavier hydrocarbons to produce a methane-rich overhead product and a $CO_2$-rich bottom product comprising the steps of:
    (a) introducing a feed gas stream comprising carbon dioxide, methane and heavier hydrocarbons into an absorptive distillation zone at elevated pressure;
    (b) introducing a physical solvent in the amount of approximately 0.5–5 moles of solvent per mole of feed into the upper zone of the distillation zone to absorb $CO_2$ and heavier hydrocarbons from such feed gas stream;
    (c) withdrawing a methane-rich overhead stream from said distillation zone as a product without subjecting it to any overhead condenser-reflux duty;
    (d) removing heat from said distillation zone in at least one intermediate stage of the distillation zone between the point of entry of the physical solvent and the feed location;
    (e) removing and heating the $CO_2$ and heavier hydrocarbon-containing physical solvent at approximately the elevated pressure of the feed gas stream to separately recover at least a regenerated physical solvent for recycle to step (b) and a $CO_2$-rich bottom product.

2. The process of claim 1 wherein the feed gas stream is at a pressure in the range of approximately 200 to 1000 psia.

3. The process of claim 1 wherein the feed gas stream is initially cooled to a temperature in the range of approximately 0° F. to 50° F.

4. The process of claim 1 wherein heat is removed from said distillation zone in two intermediate stages.

5. The process of claim 1 wherein the intermediate stage is approximately midway between the point of introduction of the physical solvent and the point of introduction of the feed gas stream.

6. The process of claim 1 wherein the heat removal of step (d) is accomplished by removal of distillation zone fluid, cooling of said removed fluid by heat exchange with a source of refrigeration and return of the cooled fluid to said distillation zone.

7. The process of claim 1 wherein the heat of step (e) is provided in the range of approximately 50° F. to 150° F.

8. The process of claim 1 wherein the separate recovery of physical solvent and $CO_2$-rich bottom product is accomplished by distillation at relatively high pressure.

9. The process of claim 8 wherein the pressure is in the range of approximately 300 to 400 psia.

10. The process of claim 1 wherein the physical solvent of step (b) is precooled to a temperature of approximately 0° F. to 50° F. before being introduced into the distillation zone.

11. The process of claim 1 wherein hydrocarbons in the range of $C_2$ to $C_5$ are separately recovered from the $CO_2$ and heavier hydrocarbon absorbed physical solvent in step (e).

12. The process of claim 1 wherein the physical solvent is selected from the group comprising $C_7$ to $C_8$ hydrocarbons and mixtures thereof.

13. The process of claim 1 wherein the feed gas stream is essentially in the gaseous phase.

14. The process of claim 1 wherein in step (e) a methane-rich stream is separately recovered and recycled to the feed gas stream.

15. A process for the physical solvent absorptive distillation of a gaseous feed stream containing carbon dioxide, hydrogen sulfide, methane and heavier hydrocarbons to separate an essentially methane overhead product and an essentially $CO_2$-rich and $H_2S$-containing bottom product comprising the steps of:
   (a) cooling the gaseous feed stream to a temperature in the range of 0° F. to 50° F. at an elevated pressure of 200 to 1000 psia.
   (b) introducing said cooled feed stream in the gaseous phase into a physical solvent absorptive distillation zone operated at 0° F. to 50° F. and 200 to 1000 psia;
   (c) introducing a physical solvent, in the liquid phase, comprising of $C_7$ to $C_8$ hydrocarbons, into the upper zone of the distillation zone at a flow rate and temperature to maintan a constant temperature in said distillation zone and to selectively absorb $CO_2$, $H_2S$ and heavier hydrocarbons from said feed stream.
   (d) withdrawing an essentially methane overhead product from said distillation zone without subjecting said product to cooling by condensation or reflux duty from a refrigeration source;
   (e) removing the heat of absorption from said distillation zone in two intermediate stages of the distillation zone between the point of introduction of the physical solvent into said zone and the point of introduction of said feed stream into said zone by removing a portion of the distillation zone liquid in each said stage for cooling by heat exchange with a refrigeration source before returning said cooled liquids to said zone;
   (f) removing the $CO_2$, $H_2S$ and heavier hydrocarbon-containing physical solvent from said distillation zone and heating it at essentially the feed stream elevated pressure in a second distillation zone to separately recover a regenerated essentially physical solvent, an essentially $CO_2$-rich and $H_2S$-containing bottom product and a methane-rich stream for recycle to said feed gas stream; and
   (g) cooling said regenerated physical solvent to a temperature of approximately 0° F. to 50° F. by heat exchange against a refrigeration source and introducing said cooled solvent into the distillation zone as the solvent of step (c).

16. The process of claim 15 wherein the gaseous feed stream is the product of a $CO_2$ miscible flood enhanced petroleum recovery process and said $CO_2$-rich, $H_2S$-containing bottom product is reintroduced into the recovery process to enhance the petroleum recovery.

17. The process of claim 15 wherein hydrocarbons in the range of $C_2$ to $C_5$ are separately recovered from the $CO_2$, $H_2$, and heavier hydrocarbon-containing physical solvent in step (f).

* * * * *